United States Patent
Phan Huy (10) Patent No.: US 9,553,651 B2
(45) Date of Patent: Jan. 24, 2017

(54) METHOD OF HIGH-BITRATE WIRELESS COMMUNICATION WITH A MULTI-ANTENNA RECEIVER

(71) Applicant: Orange, Paris (FR)

(72) Inventor: Dinh Thuy Phan Huy, Paris (FR)

(73) Assignee: ORANGE, Paris (FR)

( * ) Notice: Subject to any disclaimer, the term of this patent is extended or adjusted under 35 U.S.C. 154(b) by 107 days.

(21) Appl. No.: 14/401,782

(22) PCT Filed: May 13, 2013

(86) PCT No.: PCT/FR2013/051043
§ 371 (c)(1),
(2) Date: Nov. 17, 2014

(87) PCT Pub. No.: WO2013/171417
PCT Pub. Date: Nov. 21, 2013

(65) Prior Publication Data
US 2015/0171950 A1   Jun. 18, 2015

(30) Foreign Application Priority Data
May 16, 2012   (FR) ..................... 12 54510

(51) Int. Cl.
*H04B 7/06* (2006.01)
*H04L 27/26* (2006.01)
*H04L 27/34* (2006.01)
*H04B 7/04* (2006.01)
*H04L 25/03* (2006.01)

(52) U.S. Cl.
CPC .......... *H04B 7/0697* (2013.01); *H04B 7/0456* (2013.01); *H04L 27/2698* (2013.01); *H04L 27/3405* (2013.01); *H04L 25/03891* (2013.01)

(58) Field of Classification Search
CPC ............... H04B 7/06; H04B 7/04; H04B 7/02; H04B 7/0697; H04B 7/0456; H04B 27/3405; H04B 27/2698; H04B 27/2602; H04B 27/2627; H04B 27/265; H04B 27/00
See application file for complete search history.

(56) References Cited

U.S. PATENT DOCUMENTS

2011/0110458 A1* 5/2011 Siohan ............... H04L 27/2602
375/295
2012/0087382 A1 4/2012 Zhang et al.

OTHER PUBLICATIONS

Spencer et al., "Zero-Forcing Methods for Downlink Spatial Multiplexing in Multiuser MIMO Channels"; Feb. 2004.*

(Continued)

*Primary Examiner* — Faruk Hamza
*Assistant Examiner* — Aixa Guadalupe-Cruz
(74) *Attorney, Agent, or Firm* — David D. Brush; Westman, Champlin & Koehler, P.A.

(57) ABSTRACT

A method is provided for transmitting data between a transmitter having M>=1 transmit antenna(s), and one or more receivers having a total of N>=2 receive antennas. In the method, the data are transmitted using OFDM/OQAM modulation having L>=1 subcarriers. The transmitted data are pre-encoded using a pre-encoding matrix, the size of which is M s N and which is dependent on a zero-forcing matrix and on a spatial multiplexing matrix.

11 Claims, 6 Drawing Sheets

(56) References Cited

OTHER PUBLICATIONS

International Search Report and Written Opinion dated Aug. 16, 2013 for corresponding International Application No. PCT/FR2013/051043, filed May 13, 2013.
Zorba et al., "Spatial Diversity Scheme to Efficiently Cancel ISI and ICI in OFDM-OQAM Systems", Journal of Computer Systems, Networks, and Communications, vol. 2010, 576243, Oct. 4, 2010, pp. 1-10, XP002710702.
Payaro et al., "Performance Comparison Between FBMC and OFDM in MIMO Systems Under Channel Uncertainty", Wireless Conference (EW), 2010 European, IEEE, Piscataway, NJ, USA, Apr. 12, 2010, pp. 1023-1030, XP031688574.
Payaro et al., "Resource Allocation in Multi-Antenna MAC Networks: FBMC vs OFDM", Vehicular Technology Conference (VTC Spring), 2011 IEEE 73rd, IEEE, May 15, 2011, pp. 1-5, XP031896965.
Le Floch et al: "Coded Orthogonal Frequency Division Multiplex", Proceedings of the IEEE, vol. 83, No. 6, Jun. 1995, pp. 982-996.
Siohan et al: "Analysis and Design of OFDM/OQAM Systems Based on Filterbank Theory," IEEE Transactions on Signal Processing, vol. 50, No. 5, May 2002, pp. 1170-1183.
English translation of Written Opinion dated Nov. 16, 2014 for corresponding International Patent Application No. PCT/FR2013/051043, filed May 13, 2013.
El Tabach, M. et al: "Spatial Data Multiplexing over OFDM/OQAM Modulations", IEEE Communications Society 2007.
Ihalainen, T. et al: "Channel Equalization for Multi-Antenna FBMC/OQAM Receivers", IEEE Transactions on Vehicular Technology (Jun. 2011), vol. 60, No. 5, pp. 2070-2085.

\* cited by examiner

METHOD OF HIGH-BITRATE WIRELESS COMMUNICATION WITH A MULTI-ANTENNA RECEIVER

CROSS-REFERENCE TO RELATED APPLICATIONS

This application is a Section 371 National Stage Application of International Application No. PCT/FR2013/051043, filed May 13, 2013, the content of which is incorporated herein by reference in its entirety, and published as WO 2013/171417 on Nov. 21, 2013, not in English.

FIELD OF THE DISCLOSURE

The present invention relates to wireless communications, in particular radio communications according to the IEEE 802.11, IEEE 802.16, 3GPP LTE Advanced, and DVB standards.

More precisely, the invention relates to a data transmission system comprising a transmitter equipped with one or more transmit antenna(s), and a receiver equipped with at least two receive antennas. Such a system is termed SIMO (the initials standing for "Single Input Multiple Output") when the system comprises only a single transmit antenna, and MIMO (the initials standing for "Multiple Input Multiple Output") when the system comprises several transmit antennas.

BACKGROUND OF THE DISCLOSURE

With respect to SISO systems (the initials standing for "Single Input Single Output") comprising a single transmit antenna and a single receive antenna, SIMO/MIMO systems advantageously make it possible, by means of spatial multiplexing, to increase the data transmission bitrate. It is recalled in this regard that the technique of "spatial multiplexing" consists in cutting the data stream to be transmitted into a certain number of sub-streams (thereby, advantageously, dividing the required passband accordingly), and then in simultaneously transmitting the various sub-streams, and finally in appropriately recombining the respective signals received on the receive antennas. The number of actually independent signals that it is thus possible to transmit by means of an MIMO system is equal to the rank of the transfer matrix H (matrix of dimension N·M, where N designates the number of receive antennas, and M the number of transmit antennas). The spectral efficiency of the system therefore depends on the number of independent signals, but also on the BER (the initials standing for "Bit Error Rate") associated with each sub-stream—hence the benefit of furthermore envisaging a multi-antenna coding (called "space-time coding") so as to reduce the BER.

It is recalled moreover that so-called OFDM modulation (the initials standing for "Orthogonal Frequency Division Multiplexing") efficiently reduces the interference between data symbols. Moreover, OFDM is relatively fairly uncomplex to implement; in particular, OFDM signal modulation can be implemented in an efficient manner by means of an Inverse Fast Fourier Transform (IFFT), and the demodulation of an OFDM signal can be implemented in an efficient manner by means of a direct Fast Fourier Transform (FFT). However, OFDM modulation exhibits the drawback of being rather inefficient spectrally (because of the use of a "cyclic prefix").

Another modulation, called "OFDM/OQAM", has therefore been proposed which exhibits the advantage of being spectrally efficient (since it does not require any cyclic prefix, in contradistinction to OFDM), while circumventing (like OFDM) interference between symbols in a fairly uncomplex manner (the acronym OQAM is formed of the initials of the words "Offset Quadrature Amplitude Modulation").

However, this quasi-absence of interference between symbols is obtained only in the case of SISO systems. Indeed, as demonstrated in the article by M. Payaró, A. Pascual-Iserte and M. Nájar entitled "Performance Comparison between FBMC and OFDM in MIMO Systems under Channel Uncertainty" (IEEE Wireless Conference 2010, Piscataway, N.J., USA, April 2010), the OFDM/OQAM modulation causes, in the case of SIMO/MIMO systems, interference between symbols, whose significance is all the larger the larger the errors (in practice inevitable) in the estimation of the channel.

In this same article, the authors propose a spatial multiplexing/spatial demultiplexing method intended to reduce such interference. More precisely, given a transmitter furnished with M transmit antennas and a receiver furnished with N receive antennas, the receiver obtains an estimate of the transfer matrix of the MIMO channel between the transmitter and the receiver for a given sub-carrier; thereafter, for this sub-carrier, a multiplexing vector (with M complex components) is determined which is proportional to an eigenvector of this estimate associated with the largest eigenvalue of this estimate; finally, the receiver determines a demultiplexing vector (with N complex components) for this sub-carrier by receiving pilot symbols dispatched by the transmitter, and by minimizing the mean square error over the symbols received after demultiplexing.

This method according to the article by Payaró et al. has the drawback of requiring very complex calculations, notably at the receiver level.

SUMMARY

The present invention therefore relates to a method of wireless transmission, by a wireless transmitter furnished with M≥1 transmit antenna(s), of data intended for R≥1 wireless receiver(s), each wireless receiver No. r, where r=1, . . . , R being furnished with $N_r$ receive antennas, where $\Sigma_{r=1}^{R} N_r = N$ and N≥2, in which said data are transmitted by means of an OFDM/OQAM modulation comprising L≥1 sub-carriers, said method comprising, for at least one value of the integer l, where 0≤l≤L−1, a prior step of obtaining an estimate $\hat{H}^{(l)}$ of the transfer matrix, of dimension N·M, of the MIMO channel between said transmit antennas and said receive antennas. Said method of wireless transmission is noteworthy in that, for said value of l, it furthermore comprises the following steps:

placement of data to be transmitted in a data vector $X^{(l)}$ with N real components, calculation of a coded data vector $S^{(l)} = W^{(l)} \cdot X^{(l)}$ with M components, where $W^{(l)}$ is a precoding matrix of dimension M·N of the form:

$$W^{(l)} = Q \cdot \Re(\hat{H}^{(l)} \cdot P^{(l)}), \text{ where:}$$

$P^{(l)}$ is the matrix, of dimension M·N, associated with a spatial multiplexing, and
$Q = (\hat{H}^{(l)})^H \cdot [\hat{H}^{(l)} \cdot (\hat{H}^{(l)})^H]^{-1}$, and transmission of said coded data vector $S^{(l)}$ on the sub-carrier l, by transmitting the m-th component, where m=1, 2, . . . , M, of the vector $S^{(l)}$ from the m-th transmit antenna.

The invention also relates to a method of wireless communication. Said method is noteworthy in that it comprises the steps of a method of transmission such as is described succinctly hereinabove, and in that, for said value of l, at least one wireless receiver No. r, where r=1, . . . , R, implements the following steps:

reception of said coded data,
determination of a received vector $Y_{(r)}^{(l)}$ and
obtaining of a decoded data vector $T_{(r)}^{(l)}$ on the basis of said received vector $Y_{(r)}^{(l)}$, where the received vector $Y_{(r)}^{(l)}$ is the vector with $N_r$ real components, whose n-th component, where n=1, 2, . . . , $N_r$, is equal to the symbol associated with the sub-carrier l received on the n-th receive antenna, after OFDM/OQAM demodulation and extraction of the real part.

Thus, the method of transmission succinctly described hereinabove combines a particular precoding comprising a spatial multiplexing, with an OFDM/OQAM modulation. This combination according to the invention, applied to an SIMO/MIMO system, makes it possible to benefit at one and the same time from the spectral efficiency offered by spatial multiplexing and from that offered by OFDM/OQAM modulation.

Moreover, very advantageously, the combination according to the present invention makes it possible, after OFDM/OQAM demodulation and a simple extraction of the real part, to avoid any interference between symbols and between sub-carriers, and to do so whatever the number of transmit or receive antennas. Indeed, as demonstrated hereinbelow, said received vector $Y_{(r)}^{(l)}$ has the same form as a conventional OFDM signal, that is to say one without interference, except that the channel, the data and the noise are real. Receiver No. r can therefore, to obtain said decoded data vector $T_{(r)}^{(l)}$ on the basis of the received vector $Y_{(r)}^{(l)}$ apply the conventional techniques used in OFDM (introduction of pilots in the time-frequency frame, channel estimation with the aid of the pilots, demultiplexing, channel equalization, and so on and so forth)—with an additional simplification: the calculations required by the present invention can (if so desired) be performed entirely in the real domain (real pilots, real data, real equivalent channel), whereas the calculations required by the techniques according to the prior art must necessarily be performed in the complex domain.

It will be noted that this simplicity of processing at the receiver level makes it possible to apply the present invention to systems comprising a plurality of receivers (so-called "multi-user MIMO" systems), in which, as indicated hereinabove, a receiver can be connected to one or more of the N receive antennas considered (each receive antenna being of course connected to a single receiver). On the contrary, the method according to the article by Payaró et al., succinctly described hereinabove, can be applied only to systems comprising a single receiver (so-called "single-user MIMO" systems), because of the necessarily collective processing, by this receiver, of the data received on the set of receive antennas.

In this regard, it will be noted that in the method of communication according to the invention, the step of extracting the real part is implemented before the equalization step, whereas in the article by Payaró et al., these two steps are implemented in the reverse order.

Correlatively, the invention relates to a wireless transmitter furnished with M≥1 transmit antenna(s), comprising means for transmitting data intended for R≥1 wireless receiver(s), each wireless receiver No. r, where r=1, . . . , R being furnished with $N_r$ receive antennas, where $\Sigma_{r=1}^{R} N_r = N$ and N≥2, by means of an OFDM/OQAM modulation comprising L≥1 sub-carriers, as well as means for obtaining, for at least one value of the integer l, where 0≤l≤L−1, an estimate $\hat{H}^{(l)}$ of the transfer matrix, of dimension N·M, of the MIMO channel between said transmit antennas and said receive antennas. Said wireless transmitter is noteworthy in that, for said value of l, it furthermore comprises means for:

placing data to be transmitted in a data vector $X^{(l)}$ with N real components,
calculating a coded data vector $S^{(l)} = W^{(l)} \cdot X^{(l)}$ with M components, where $W^{(l)}$ is a precoding matrix of dimension M·N of the form:

$$W^{(l)} = Q \cdot \Re(\hat{H}^{(l)} \cdot P^{(l)}), \text{ where:}$$

$P^{(l)}$ is the matrix, of dimension M·N, associated with a spatial multiplexing, and
$Q = (\hat{H}^{(l)})^H \cdot [\hat{H}^{(l)} \cdot (\hat{H}^{(l)})^H]^{-1}$, and transmitting said coded data vector $S^{(l)}$ on the sub-carrier l, by transmitting the m-th component, where m=1, 2, . . . , M, of the vector $S^{(l)}$ from the m-th transmit antenna.

The invention also relates to a wireless communication system. Said system is noteworthy in that it comprises a wireless transmitter such as described succinctly hereinabove, as well as said R wireless receiver(s), and in that, for said value of l, at least one wireless receiver No. r, where r=1, . . . , R, comprises means for:

receiving said coded data,
determining a received vector $Y_{(r)}^{(l)}$, and
obtaining a decoded data vector $T_{(r)}^{(l)}$ on the basis of said received vector $Y_{(r)}^{(l)}$, where the received vector $Y_{(r)}^{(l)}$ is the vector with $N_r$ real components, whose n-th component, where n=1, 2, . . . , $N_r$, is equal to the symbol associated with the sub-carrier l received on the n-th receive antenna, after OFDM/OQAM demodulation and extraction of the real part.

The advantages offered by this wireless transmitter and by this wireless communication system are essentially the same as those offered by the correlative methods succinctly set forth hereinabove.

It will be noted that it is possible to embody this wireless transmitter and these wireless receivers in the context of software instructions and/or in the context of electronic circuits.

The invention is also aimed at a computer program downloadable from a communication network and/or stored on a medium readable by computer and/or executable by a microprocessor. This computer program is noteworthy in that it comprises instructions for the execution of the steps of the method of wireless transmission, or of the method of wireless communication succinctly set forth hereinabove, when it is executed on a computer.

The advantages offered by this computer program are essentially the same as those offered by the corresponding methods.

BRIEF DESCRIPTION OF THE DRAWINGS

Other aspects and advantages of the invention will become apparent on reading the description detailed hereinbelow of particular embodiments, given by way of non-limiting examples. The description refers to the figures which accompany it, in which:

FIG. 3c illustrates a third step of a method for receiving data according to the state of the art, FIG. 4 summarizes the steps illustrated in FIGS. 3a, 3b and 3c, FIG. 5 schematically represents, according to an embodiment of the invention, the coding of data vectors each associated with a respective sub-carrier of the OFDM/OQAM multiplex so as to obtain respective coded data vectors, as well as the transmission of the m-th component of these coded data vectors on transmit antenna number m, and FIG. 6 schematically represents, according to an embodiment of the invention, the reception of symbols on each receive antenna of a receiver, and the determination of a received vector with N components for each sub-carrier of the OFDM/OQAM multiplex.

DETAILED DESCRIPTION OF ILLUSTRATIVE EMBODIMENTS

The present invention applies to a wireless communication system comprising a transmitter furnished with M≥1 transmit antenna(s), and one or more receiver(s) furnished with N≥2 receive antennas in total. The transmission of data uses an OFDM/OQAM modulation comprising an arbitrary number L≥1 of sub-carriers.

We shall firstly recall the principle of OFDM/OQAM modulation, such as it has been applied to SISO systems (which do not therefore offer the possibility of benefiting from the advantages of spatial multiplexing).

To begin let us consider an OFDM modulation comprising an even number Q of sub-carriers. A signal transmitted s(t) transporting a complex QAM data symbol (the initials standing for "Quadrature Amplitude Modulation") per sub-carrier and per symbol time $T_0=1/F_0$, is then arranged in such a way that, for each pair of successive sub-carriers, it comprises:

- on one of these sub-carriers, a time offset ("temporal shift") equal to $T_0/2$ on the imaginary part of a given QAM symbol, and
- on the other sub-carrier, one and the same time offset of $T_0/2$ on the real part of the same QAM symbol.

This signal transmitted can be written in the form $$s(t) = \sqrt{2} \sum_{l=0}^{Q-1} \sum_{j=-\infty}^{+\infty} a_{l,j} p\left(t - j\frac{T_0}{2}\right) e^{i2\pi l F_0 t} e^{i\varphi_{l,j}}, \quad (1)$$

where:
- the integer l enumerates the sub-carriers, and the integer j enumerates the symbol times,
- the real coefficients $a_{l,j}$ are defined on the basis of the real and imaginary parts of the QAM symbols $c_{l,j}$ as follows:

$$a_{2l',2j'} = \Re\{c_{2l',j'}\}, \ a_{2l',2j'+1} = \Im\{c_{2l',j'}\},$$

$$a_{2l'+1,2j'} = \Im\{c_{2l'+1,j'}\}, \ a_{2l'+1,2j'+1} = \Re\{c_{2l'+1,j'}\}, \quad (2)$$

where $\Re\{\ldots\}$ represents the extraction of the real part and $\Im\{\ldots\}$ represents the extraction of the imaginary part, the phase shifts $\phi_{l,j}$ are equal to:

$$\varphi_{2l',2j'} = 0, \ \varphi_{2l',2j'+1} \quad (3)$$

$$= \frac{\pi}{2}, \ \varphi_{2l'+1,2j'}$$

$$= \frac{\pi}{2}, \ \varphi_{2l'+1,2j'+1}$$

$$= 0, \text{ and}$$

the "prototype function" p(t) is real and symmetric.

In the article by B. Le Floch, M. Alard and C. Berrou entitled "Coded Orthogonal Frequency Division Multiplex" (Proc. IEEE, vol. 83, pages 982 to 996, June 1995), which describes a category of modulations comprising, among others, OFDM/OQAM, the prototype function p(t) is chosen in such a way that its Fourier transform is zero outside of a frequency band of width $2F_0$.

In the article by P. Siohan, C. Siclet, and N. Lacaille entitled "Analysis and Design of OFDM/OQAM Systems Based on Filterbank Theory" (IEEE Transactions on Signal Processing, vol. 50 No. 5, pages 1170 to 1183, May 2002), the prototype function p(t) is chosen in such a way that it is zero outside of the time interval $$\left[-\frac{\lambda T_0}{2Q}, +\frac{\lambda T_0}{2Q}\right],$$

where λ is any strictly positive integer; if the time t is discretized into intervals of length $$\frac{T_0}{Q}$$

(average duration of sampling per QAM symbol) enumerated by the integer k, the support of the discretized prototype function p[k] is therefore of length λ.

Siohan, Siclet and Lacaille demonstrate that, to obtain an OFDM/OQAM transmission without interference between symbols or between sub-carriers, the prototype function p(t) must satisfy the following relation, the so-called "orthogonality relation":

$$G_l(z)G_l^*(z^{-1}) + G_{l+Q/2}(z)G_{l+Q/2}^*(z^{-1}) = \frac{1}{Q} \quad (4)$$

for $$0 \leq l \leq \frac{Q}{2} - 1,$$

where the asterisk designates the complex conjugate, and the z-transforms $$G_l(z) = \Sigma_k z^{-k} p[l+kQ] \quad (5)$$

are called "polyphase components of order Q" of the prototype function p[k].

Siohan, Siclet and Lacaille also demonstrate that OFDM/OQAM modulation can advantageously be implemented by means of an IFFT, and OFDM/OQAM demodulation can advantageously be implemented by means of an FFT.

Accordingly, the discretized signal $$s[k] \equiv \sqrt{\frac{T_0}{Q}} s\left(\left(k - \frac{\lambda-1}{2}\right)\frac{T_0}{Q}\right) \quad (6)$$

$$= \sqrt{2} \sum_{l=0}^{Q-1} \sum_{j=-\infty}^{+\infty} a_{l,j} p\left[k - \frac{jQ}{2}\right] e^{i\frac{2\pi}{Q}l\left(k-\frac{\lambda-1}{2}\right)} e^{i\varphi_{l,j}}$$

is rewritten in the form $$s[k] = \sum_{l=0}^{Q-1} \sum_{j=-\infty}^{+\infty} x_l^0[j] f_l\left[k - \frac{jQ}{2}\right], \quad (7)$$

where $$x_l^0[j] = a_{l,j} e^{i\frac{\pi}{2}j}, \quad (8)$$

and $$f_l[k] = \sqrt{2}\, p[k] e^{i\frac{2\pi}{Q}l\left(k-\frac{\lambda-1}{2}+\frac{Q}{4}\right)},$$

so as to exhibit this signal as a conventional sum of Q incoming signals $x_l^0[j]$ filtered respectively by a set of Q filters $$f_l\left[k - \frac{jQ}{2}\right]$$

belonging to a "bank of synthesis filters" $f_l[k]$.

Figure 1A:
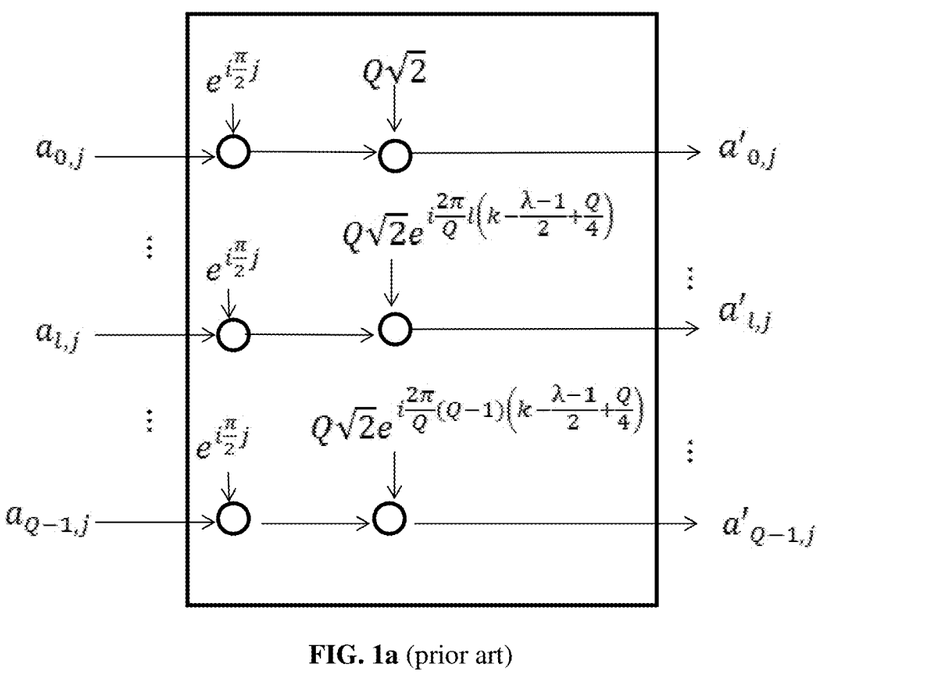
FIG. 1a illustrates a first step of a method for transmitting data according to the state of the art.
Figure 1B:
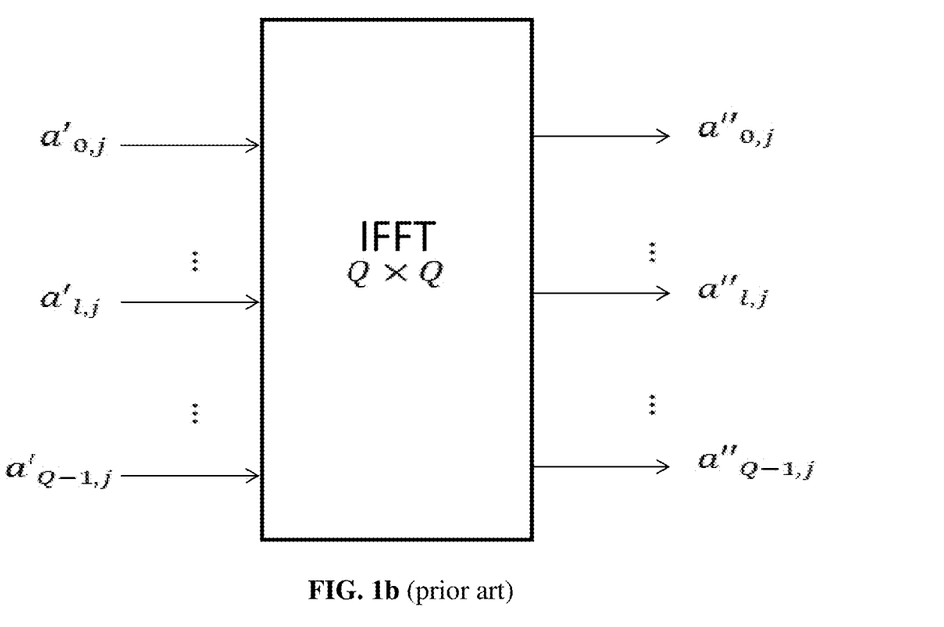
FIG. 1b illustrates a second step of a method for transmitting data according to the state of the art.
Figure 1C:
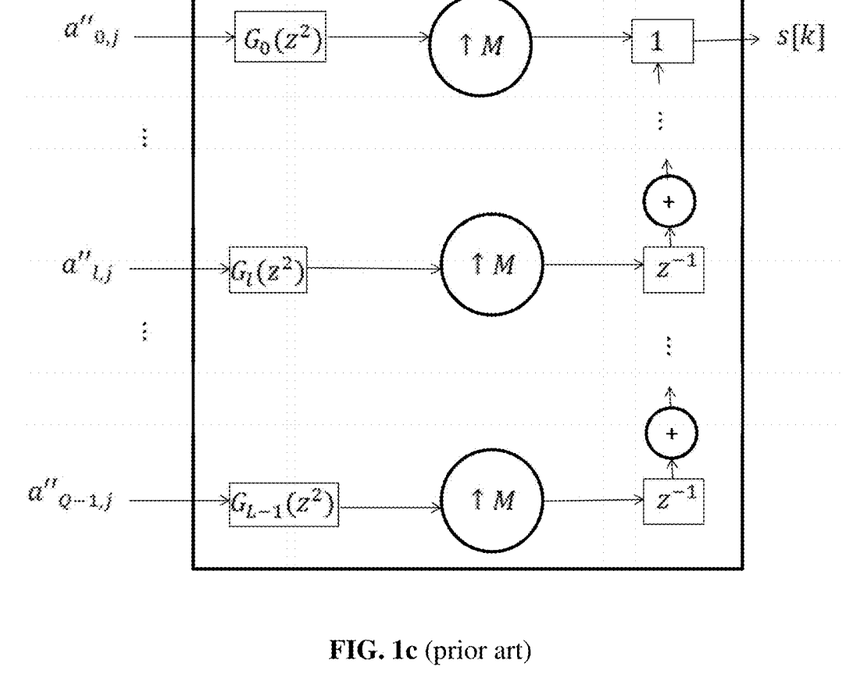
FIG. 1c illustrates a third step of a method for transmitting data according to the state of the art, FIG. 2 summarizes the steps illustrated in FIGS. 1a, 1b and 1c.

After a few calculations, it is apparent that the OFDM/OQAM modulation/transmission consists essentially in applying during each symbol time number j to an incoming vector $[a_{0,j} \ldots a_{l,j} \ldots a_{Q-1,j}]^T$ (where the exponent "T" designates the transposition) the following operations:

each component $a_{l,j}$ is multiplied by a so-called "premodulation" factor equal to $$e^{i\frac{\pi}{2}j} Q\sqrt{2}\, e^{i\frac{2\pi}{Q}l\left(k-\frac{\lambda-1}{2}+\frac{Q}{4}\right)},$$

thereby giving a vector $[a'_{0,j} \ldots a'_{l,j} \ldots a'_{Q-1,j}]^T$ (FIG. 1a), this vector $[a'_{0,j} \ldots a'_{l,j} \ldots a'_{Q-1,j}]^T$ is subjected to an IFFT of dimension Q·Q, thereby giving a vector $[a''_{0,j}, \ldots a''_{l,j} \ldots a''_{Q-1,j}]^T$ (FIG. 1b), each component $a''_{l,j}$ of this vector $[a''_{0,j}, \ldots a''_{l,j} \ldots a''_{Q-1,j}]^T$ is subjected to a filtering $G_l(z^2)$, and then to an expansion of factor Q/2, and finally (except for l=0) to a delay of factor $z^{-1}$ with respect to the component $a''_{l-1,j}$; to finish, the resulting signals are summed (parallel→series transformation, denoted P/S) to give the signal s[k] (FIG. 1c).

Figure 2:
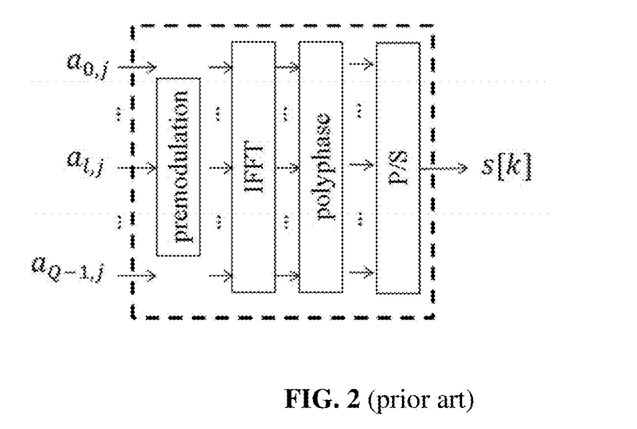

FIG. 2 summarizes the steps of modulation/transmission of an OFDM/OQAM multiplex which are described succinctly hereinabove.

It is possible to apply an analogous processing to the signal received v[k]. The demodulated signal $y_l[j]$ exiting on sub-carrier number l at symbol time number j can be written in the form $$y_l[j] = \sum_{k=-\infty}^{+\infty} v[k] h_l\left[\frac{jQ}{2} - k\right], \quad (9)$$

where $$h_l[k] = \sqrt{2}\, p[k] e^{i\frac{2\pi}{Q}l\left(k-\frac{\lambda-1}{2}-\frac{Q}{4}\right)}, \quad (10)$$

so as to make it apparent that the signal received v[k] is filtered by a set of Q filters $$h_l\left[\frac{jQ}{2} - k\right]$$

belonging to a "bank of analysis filters" $h_l[k]$.

Figure 3A:
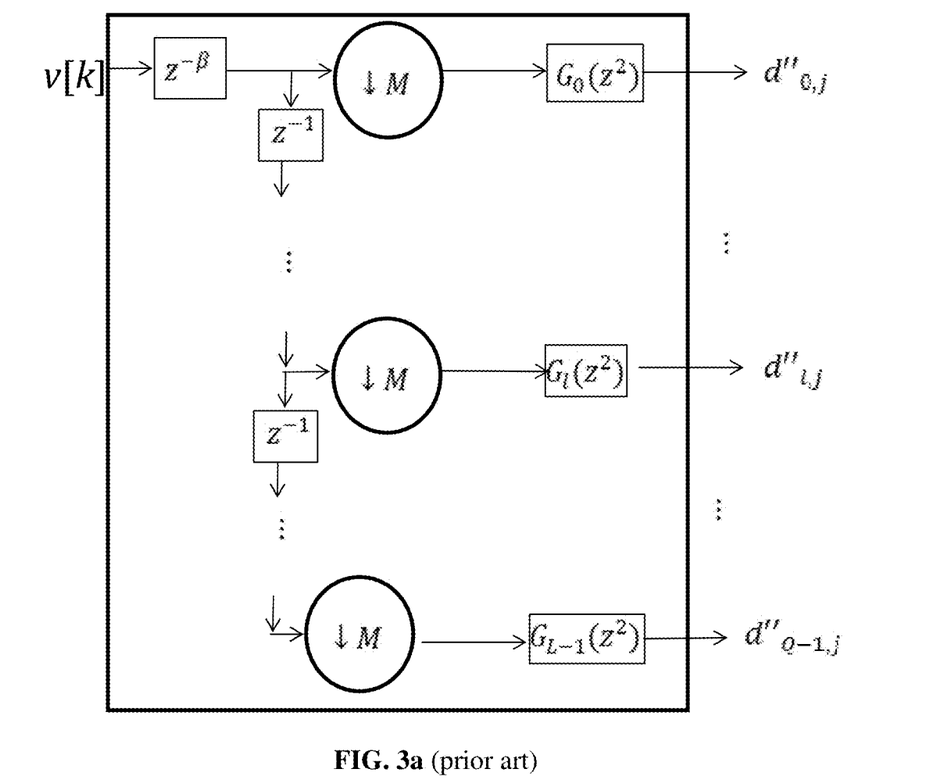
FIG. 3a illustrates a first step of a method for receiving data according to the state of the art.
Figure 3B:
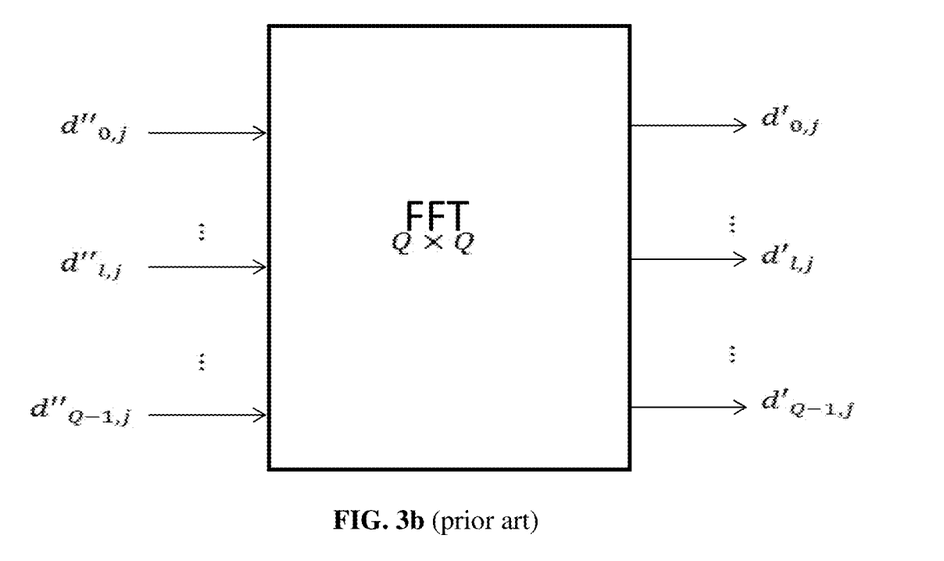
FIG. 3b illustrates a second step of a method for receiving data according to the state of the art.
Figure 3C:
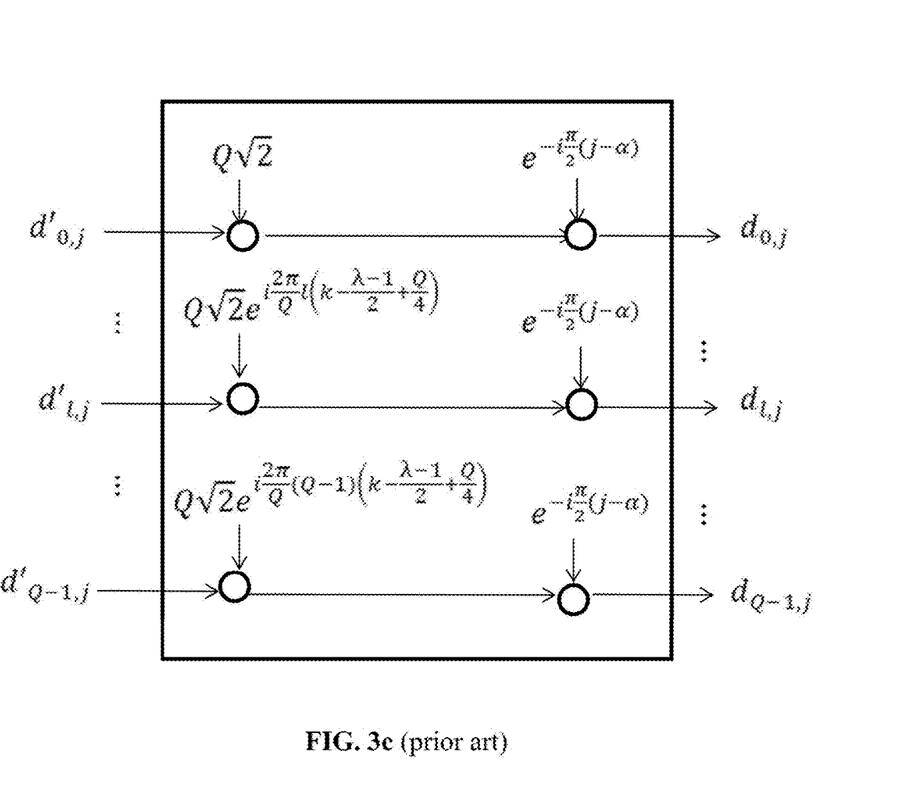

After a few calculations, it is apparent that the OFDM/OQAM reception/demodulation consists essentially in applying to the signal received v[k] during each symbol time number j the following operations:

application of a delay of factor $z^{-\beta}$, where β is the integer such that $$\beta \equiv \frac{\alpha Q}{2} - \lambda + 1,$$

with 0≤β≤Q/2−1 and α>0 integer, (11)

and then decomposition of the signal thus obtained into a sum of Q components (series→parallel transformation, denoted S/P), each of these components (except for l=0) being firstly subjected to a delay of factor $z^{-1}$ with respect to the previous component, and then decimated by a factor Q/2, and finally subjected to a filtering $G_l(z^2)$ to give the component $d''_{l,j}$, of a vector $[d''_{0,j} \ldots d''_{l,j} \ldots d''_{Q-1,j}]^T$ (FIG. 3a), this vector $[d''_{0,j} \ldots d''_{l,j} \ldots d''_{Q-1,j}]^T$ is subjected to an FFT of dimension Q·Q, thereby giving a vector $[d''_{0,j} \ldots d''_{l,j} \ldots d''_{Q-1,j}]^T$ (FIG. 3b), each component $d'_{l,j}$ of this vector $[d'_{0,j} \ldots, d'_{l,j} \ldots d'_{Q-1,j}]^T$ is multiplied by a so-called "postdemodulation" factor equal to $$Q\sqrt{2}\, e^{i\frac{2\pi}{Q}l\left(k-\frac{\lambda-1}{2}+\frac{Q}{4}\right)} e^{-i\frac{\pi}{2}(j-\alpha)},$$

thereby ultimately giving the, real, component $d_{l,j}$ of the vector $[d_{0,j} \ldots d_{l,j} \ldots d_{Q-1,j}]^T$ (FIG. 3c).

Figure 4:
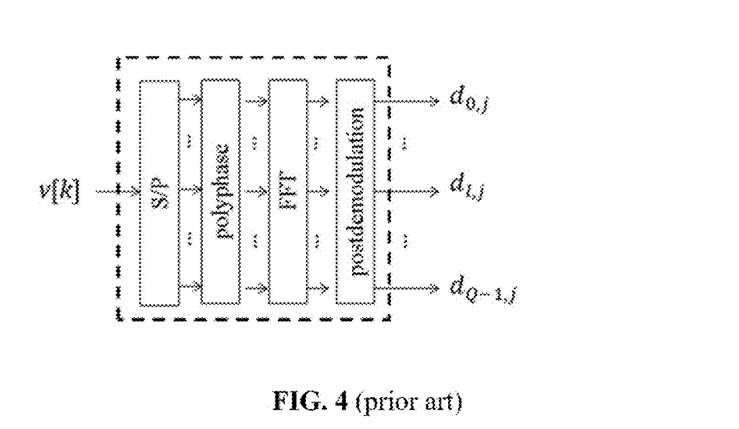

FIG. 4 summarizes the steps of reception/demodulation of an OFDM/OQAM multiplex which are described succinctly hereinabove.

To finish, it will be noted, on the basis of equation (2) hereinabove, that if zero values are systematically chosen for the QAM symbols corresponding to an even sub-carrier number l, then there is no need to take into account the sub-carriers of even number, and if zero values are systematically chosen for the QAM symbols corresponding to an odd sub-carrier number l, then there is no need to take into account the sub-carriers of odd number. Thus, in both these cases, the effective number of sub-carriers is Q/2, which may be even or odd. It is therefore seen that the number (designated by L within the framework of the present invention) of sub-carriers which is used to implement an OFDM/OQAM modulation may either be even or odd.

We shall now describe a method for transmitting data according to an embodiment of the invention, in which coded data are transmitted on each of the L sub-carriers of an OFDM/OQAM multiplex. As a variant, it would be possible to take into account just one, or a subset, of these sub-carriers.

In this embodiment, the transmitter knows, for each integer l, where $0 \leq l \leq L-1$, an estimate $\hat{H}^{(l)}$ of the transfer matrix of the MIMO channel associated with this sub-carrier. This estimate can be obtained by any known means. For example, in FDD ("Frequency Division Multiplexing") mode, the estimation can be performed by the receiver, which thereafter transmits the estimate to the transmitter; in TDD ("Time Division Multiplexing") mode, the transmitter can perform this estimation directly on the basis of pilot signals transmitted by the receiver.

It will be assumed that the Hermitian matrix $[\hat{H}^{(l)} \cdot (\hat{H}^{(l)})^H]$, where the exponent "H" designates the complex conjugate transpose, is invertible (which is generally the case in practice).

Figure 5:
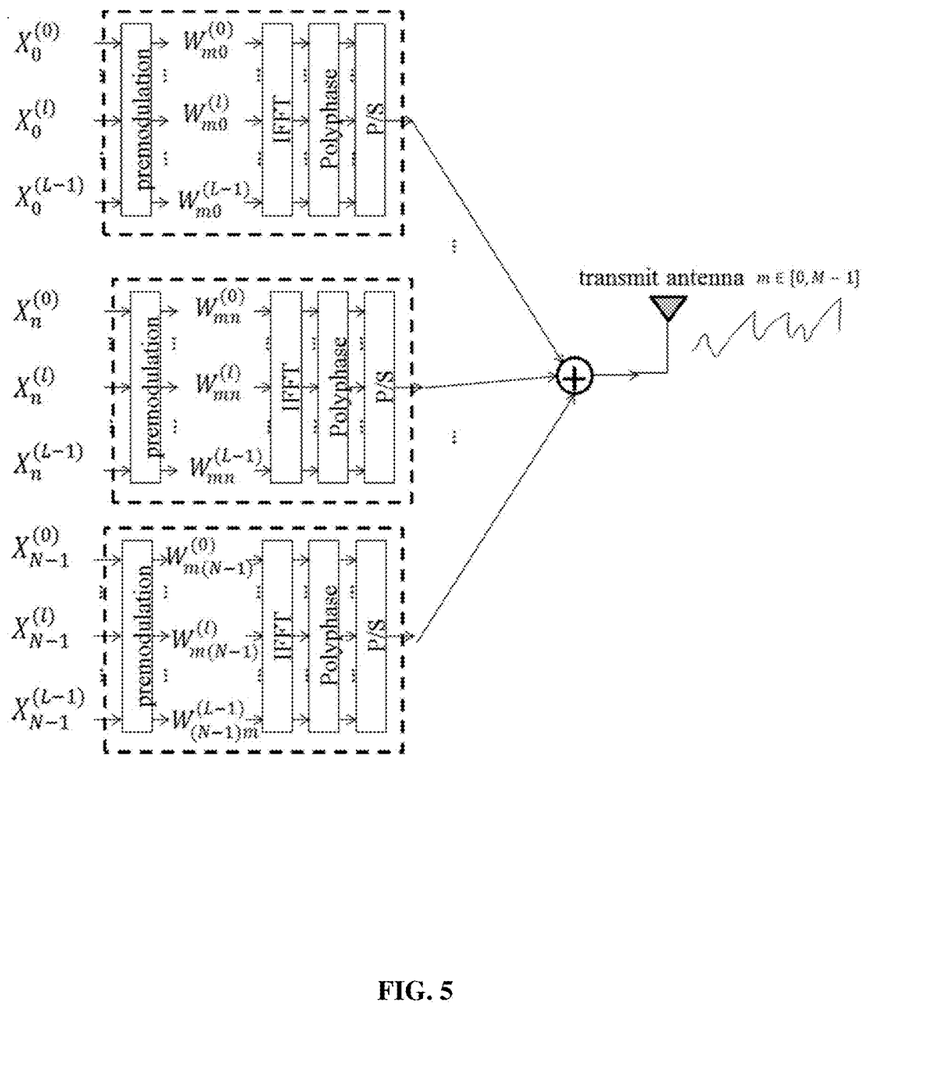

The transmitter implements the following steps, illustrated in FIG. 5.

During a step E1, the transmitter places data to be transmitted in a data vector $X^{(l)}$ with N real components.

During a step E2, the transmitter calculates a coded data vector $S^{(l)} = W^{(l)} \cdot X^{(l)}$ with M components, where $W^{(l)}$ is a precoding matrix of dimension M·N chosen as follows:

$$W^{(l)} = Q \cdot \Re(\hat{H}^{(l)} \cdot P^{(l)}), \quad (12)$$

where:
- $P^{(l)}$ is the matrix, of dimension M·N, associated with a spatial multiplexing, and
- $Q = (\hat{H}^{(l)})^H \cdot [\hat{H}^{(l)} \cdot (\hat{H}^{(l)})^H]^{-1}$ is the matrix known to the person skilled in the art by the name "Zero-Forcing precoding matrix".

This spatial multiplexing can be carried out according to any known scheme, with the respective advantages and drawbacks, likewise known, of each of these schemes. Two possible variants for the spatial multiplexing will be found below, by way of examples.

Finally, during a step E3, the transmitter transmits the coded data vector $S^{(l)}$ on the sub-carrier l simultaneously on all the transmitting antennas, by transmitting the m-th component, where $m = 1, 2, \ldots, M$, of the vector $S^{(l)}$ from the m-th transmit antenna.

We shall now describe a method of communication according to an embodiment of the invention, in which at least one receiver obtains decoded data associated with each of the L sub-carriers. As a variant, it would be possible to take into account just one, or a subset, of these sub-carriers.

By way of example, it will be assumed that the communication system considered comprises only a single receiver (stated otherwise, R=1); to simplify the notation, the index (1) corresponding to r=1 will be omitted hereinbelow, as well as in FIG. 6. This embodiment can easily be generalized to the case of communication systems comprising a plurality of receivers, in which each receiver No. r, where $r = 1, \ldots, R$ is furnished with $N_r$ receive antennas, with $\Sigma_{r=1}^R N_r = N$.

In the present embodiment, the receiver, in a manner synchronized with the steps described hereinabove implemented by the transmitter, implements the following steps.

Figure 6:
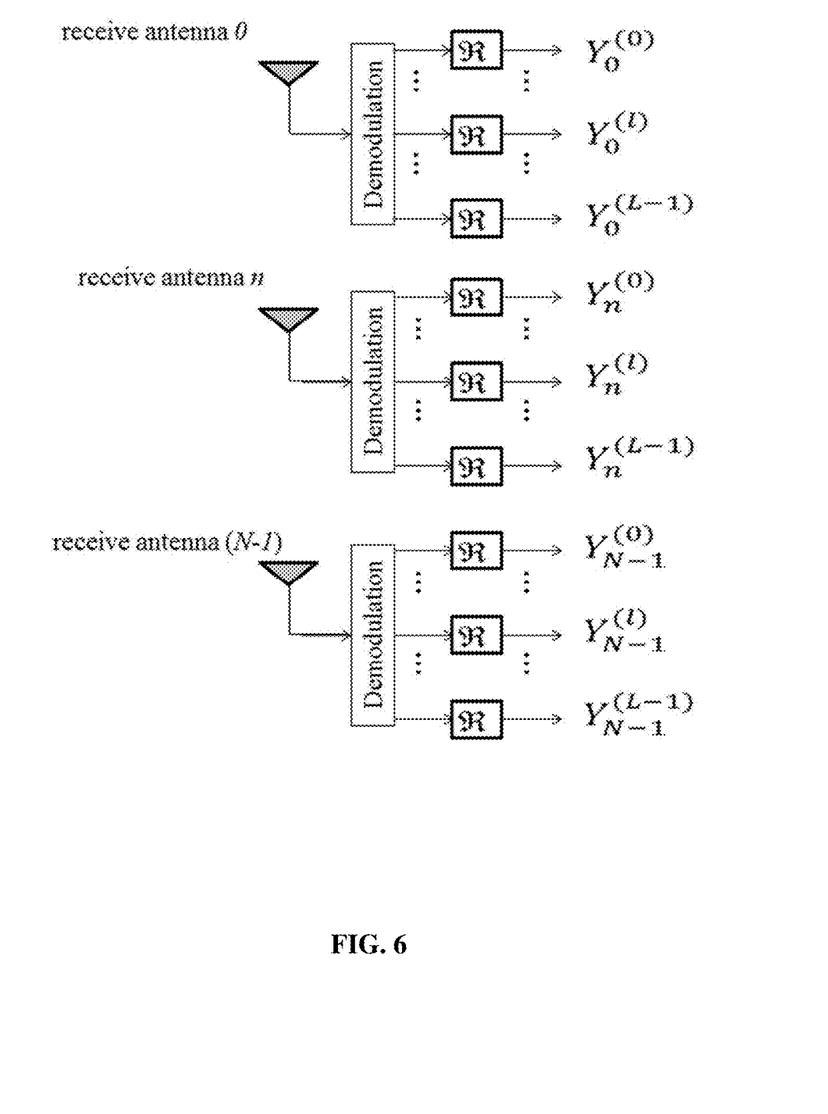

During a step R1, illustrated in FIG. 6, the receiver determines a received vector $Y^{(l)}$ with N real components, whose n-th component, where $n = 1, 2, \ldots, N$, is equal to the symbol associated with the sub-carrier l received on the n-th receive antenna, after OFDM/OQAM demodulation and extraction of the real part.

Now, the signal $V^{(l)}$ received after OFDM/OQAM demodulation is such that $$\Re\{V^{(l)}\} \approx G^{(l)} X^{(l)}, \text{ where } G^{(l)} = H^{(l)} W^{(l)} \quad (13)$$

It may easily be shown that:

$$G^{(l)} \approx \Re(\hat{H}^{(l)} P^{(l)}) \quad (14)$$

(naturally assuming that the estimation of $H^{(l)}$ contained in $W^{(l)}$ is reliable). The matrix $G^{(l)}$ is therefore real. Consequently:

$$Y^{(l)} \approx G^{(l)} X^{(l)} + U^{(l)}, \quad (15)$$

where $U^{(l)}$ is real noise. In view of equation (15), the matrix $G^{(l)}$ is called the "equivalent-channel matrix" associated with the precoding by $W^{(l)}$.

During a step R2, the receiver obtains a decoded data vector $T^{(l)}$ by applying to said received vector $Y^{(l)}$ an appropriate processing, for example a spatial demultiplexing and an equalization according to the conventional techniques used in OFDM; advantageously, to do this, the receiver has no need to process the interference between symbols specific to OFDM/OQAM.

To finish, we shall describe two possible variants for the spatial multiplexing implemented in step E2 hereinabove.

According to a first variant, an MMSE precoder is used to do this:

$$P^{(l)} = (\hat{H}^{(l)})^H \left( \hat{H}^{(l)} (\hat{H}^{(l)})^H + \frac{1}{SNR} I \right)^{-1}, \quad (16)$$

where I designates the identity matrix, and SNR the estimation, assumed known by the transmitter, of the Signal-over-Noise Ratio of the receiver, that is to say the ratio between the power received (without precoding) by the receiver, averaged over the receive antennas and the noise of the receiver.

It is recalled that in theory the optimal precoder for a system whose constraint is to transmit a stream per receive antenna is the MMSE precoder (the initials standing for "Minimum Mean-Square Error").

The advantage of this first variant is that it makes it possible to obtain, at high SNR, a better sum bitrate over the antennas than the other variants. On the other hand, the efficiency of the MMSE precoder relies on a precise estimation and a precise prediction of the SNR; but this estimation is difficult to carry out, so that in practice a poor estimation of the SNR (called "SNR mismatch" in the literature) prevents the expected performance being obtained.

According to a second variant, a time-reversal precoder is used:

$$P^{(l)} = (\hat{H}^{(l)})^H. \quad (17)$$

It is recalled in this regard that a radio signal transmitted by a transmit antenna undergoes deformations as a function of the propagation conditions between this transmit antenna and a receive antenna. In order to limit these deformations, the signal is previously distorted by applying so-called "precoding" coefficients, as a function of the characteristics of the propagation channel between these two antennas. To do so, it is therefore necessary to determine the characteristics of this propagation channel in the frequency band concerned.

Among the existing precoding schemes we distinguish the schemes implementing the technique termed "Time Reversal", on account of its reduced complexity, of its performance and of its intrinsic capacity to focus a radio wave on a receive antenna. By focusing the energy of the signal transmitted over time and in space, Time Reversal makes it possible to appreciably reduce the dispersion caused by the propagation channel.

Time Reversal is a technique (originally used in the field of acoustic waves) which relies on the time-reversal-invariance of the wave equation. Thus, a temporally reversed wave propagates as a direct wave which would rewind time. When a brief pulse transmitted by a point of origin propagates in a propagation medium, and a part of this wave received by a recipient point is reversed temporally before being returned in the propagation medium, the wave converges to the point of origin, reforming a brief pulse there. The signal gathered at the point of origin is almost identical in its shape to the signal of origin transmitted by the point of origin.

The Time Reversal technique has been applied to radio communication networks to cancel the effect of the propagation channel on the signal received by a receiving antenna, in particular by reducing the spreading of the channel by concentration of the energy at a focal point where this receiving antenna is situated and by reducing the temporal spreading (known as "delay spread") of the signal received, as well as to simplify the processing of symbols received after passing through the channel. Accordingly, the signal transmitted by a transmitting antenna is pre-equalized by applying coefficients obtained on the basis of the time-reversal of the impulse response of the propagation channel that this signal must pass through.

By virtue of equation (14) hereinabove, the matrix of the equivalent channel equals, in the case of this second variant:

$$G^{(l)} \approx \Re(\hat{H}^{(l)}(H^{(l)})^H). \tag{18}$$

Now, $\hat{H}^{(l)}(\hat{H}^{(l)})^H$ is a Hermitian matrix, therefore:
- its diagonal coefficients are already real, and
- its non-diagonal coefficients are, a priori, complex.

Whence the following advantages:
- the matrix $G^{(l)}$ has as diagonal coefficients the same coefficients as the matrix $\hat{H}^{(l)}(\hat{H}^{(l)})^H$, thus implying that the operation of extracting the real part according to equation (18) hereinabove preserves all of the useful power;
- $G^{(l)}$ has as non-diagonal coefficients the real part of the non-diagonal coefficients of $\hat{H}^{(l)}(\hat{H}^{(l)})^H$, thus implying that the operation of extracting the real part (by taking only the real part of the non-diagonal terms) reduces the inter-stream interference resulting from the spatial multiplexing; and
- it is known that, of all precodings, time-reversal is the one which maximizes the diagonal terms (this is the filter suitable for transmission), and therefore the useful part of the equivalent channel.

As mentioned hereinabove, the present invention also relates to a computerized system implementing the method of wireless transmission, or the method of wireless communication which are described hereinabove. This computerized system comprises in a conventional manner a central processing unit controlling by signals a memory, as well as an input unit and an output unit. Moreover, this computerized system can be used to execute a computer program comprising instructions for the implementation of any one of the methods according to the invention.

Indeed, the invention is also aimed at a computer program downloadable from a communication network comprising instructions for the execution of the steps of a method according to the invention, when it is executed on a computer. This computer program can be stored on a medium readable by computer and can be executable by a microprocessor.

This program can use any programming language, and take the form of source code, object code, or of code intermediate between source code and object code, such as in a partially compiled form, or in any other desirable form.

The invention is also aimed at an irremovable, or partially or totally removable, information medium readable by a computer, and comprising instructions of a computer program such as mentioned hereinabove.

The information medium can be any entity or device capable of storing the program. For example, the medium can comprise a storage means, such as a ROM, for example a CD ROM or a microelectronic circuit ROM, or a magnetic recording means, such as a hard disk, or else a USB key (known as a "USB flash drive").

Moreover, the information medium can be a transmissible medium such as an electrical or optical signal, which can be conveyed via an electrical or optical cable, by radio or by other means. The computer program according to the invention can be in particular downloaded to a network of Internet type.

As a variant, the information medium can be an integrated circuit in which the program is incorporated, the circuit being tailored to execute or to be used in the execution of any one of the methods according to the invention.

Although the present disclosure has been described with reference to one or more examples, workers skilled in the art will recognize that changes may be made in form and detail without departing from the scope of the disclosure and/or the appended claims.

The invention claimed is:

1. A method comprising:
   wireless transmission, by a wireless transmitter furnished with M≥1 transmit antenna(s), of data intended for R≥1 wireless receiver(s), each wireless receiver No. r, where r=1, . . ., R being furnished with $N_r$ receive antennas, where $\Sigma_{r=1}^R N_r = N$ and N≥2, in which said data are transmitted by using an OFDM/OQAM modulation comprising L≥1 sub-carriers, said wireless transmission comprising:
   for at least one value of the integer l, where 0≤l≤L−1, a prior step of obtaining an estimate $\hat{H}^{(l)}$ of the transfer matrix, of dimension N·M, of the MIMO channel between said transmit antennas and said receive antennas, and
   for said value of l, the following steps:
   placement of data to be transmitted in a data vector $X^{(l)}$ with N real components,
   calculation of a coded data vector $S^{(l)} = W^{(l)} \cdot X^{(l)}$ with M components, where $W^{(l)}$ is a precoding matrix of dimension M·N depending:
   on a Zero-Forcing matrix Q, and
   on the real part of a matrix representing a spatial multiplexing $P^{(l)}$ followed by a channel transfer $\hat{H}^{(l)}$, and
   transmission of said coded data vector $S^{(l)}$ on the sub-carrier l, by transmitting the m-th component, where m=1,2, . . ., M, of the vector $S^{(l)}$ from the m-th transmit antenna.

2. The method as claimed in claim 1, wherein $W^{(l)}$ is of the form:

$$W^{(l)} = Q \cdot \Re(\hat{H}^{(l)} \cdot P^{(l)}), \text{ where } Q = (\hat{H}^{(l)})^H \cdot [\hat{H}^{(l)} (\hat{H}^{(l)})^H]^{-1}.$$

3. The method as claimed in claim 1, wherein said spatial multiplexing is carried out by using the following MMSE precoder:

$$P^{(l)} = (\hat{H}^{(l)})^H \left( \hat{H}^{(l)} (\hat{H}^{(l)})^H + \frac{1}{SNR} I \right)^{-1}.$$

4. The method as claimed in claim 1, wherein said spatial multiplexing is carried out by using the following time-reversal precoder:

$$P^{(l)} = (\hat{H}^{(l)})^H.$$

5. The method of claim 1, further comprising:
for said value of l, at least one of the wireless receivers No. r, where r=1, . . ., R, implements the following steps:
reception of said coded data,
determination of a received vector $Y_{(r)}^{(l)}$, and
obtaining of a decoded data vector $T_{(r)}^{(l)}$ on the basis of said received vector $Y_{(r)}^{(l)}$,
where the received vector $Y_{(r)}^{(l)}$ is the vector with $N_r$ real components whose n-th component, where n=1, 2, . . .,$N_r$, is equal to the symbol associated with the sub-carrier l received on the n-th receive antenna, after OFDM/OQAM demodulation and extraction of the real part.

6. A wireless transmitter comprising:
M≥1 transmit antenna(s),
means for transmitting data intended for R≥1 wireless receiver(s), each wireless receiver No. r, where r=1, . . .,R being furnished with $N_r$ receive antennas, where $\Sigma_{r=1}^R N_r = N$ and N >2, by means of an OFDM/OQAM modulation comprising L≥1 sub-carriers,
means for obtaining, for at least one value of the integer l, where 0≤l≤L−1, an estimate $\hat{H}^{(l)}$ of the transfer matrix, of dimension N·M, of the MIMO channel between said transmit antennas and said receive antennas, and
for said value of l, means for:
placing data to be transmitted in a data vector $X^{(l)}$ with N real components,
calculating a coded data vector $S^{(l)} \equiv W^{(l)} \cdot X^{(l)}$ with M components, where $W^{(l)}$ is a precoding matrix of dimension M·N depending:
on a Zero-Forcing matrix Q, and
on the real part of a matrix representing a spatial multiplexing $P^{(l)}$ followed by a channel transfer $\hat{H}^{(l)}$, and
transmitting said coded data vector $S^{(l)}$ on the sub-carrier l, by transmitting the m-th component, where m=1,2, . . . , M, of the vector $S^{(l)}$ from the m-th transmit antenna.

7. The wireless transmitter of claim 6, wherein $W^{(l)}$ is of the form:

$W^{(l)} = Q \cdot \Re(\hat{H}^{(l)} \cdot P^{(l)})$, where $Q = [(\hat{H}^{(l)})^H \cdot \hat{H}^{(l)} \cdot (\hat{H}^{(l)})^H]^{-1}$.

8. The wireless transmitter as claimed in claim 6, wherein said spatial multiplexing is carried out by using the following MMSE precoder:

$$P^{(l)} = (\hat{H}^{(l)})^H \left( \hat{H}^{(l)} (\hat{H}^{(l)})^H + \frac{1}{SNR} I \right)^{-1}.$$

9. The wireless transmitter as claimed in claim 6, wherein said spatial multiplexing is carried out by using the following time-reversal precoder:

$$P^{(l)} = (\hat{H}^{(l)})^H.$$

10. A system comprising:
a wireless transmitter furnished with M≥1 transmit antenna(s), comprising means for transmitting data to R≥1 wireless receiver(s), each wireless receiver No. r, where r=1, . . . , R being furnished with $N_r$ receive antennas, where $\Sigma_{r=1}^R N_r = N$ and N≥2, by using an OFDM/OQAM modulation comprising L≥1 sub-carriers, as well as means for obtaining, for at least one value of the integer l, where 0≤l≤L−1, an estimate $\hat{H}^{(l)}$ of the transfer matrix, of dimension N·M, of the MIMO channel between said transmit antennas and said receive antennas, said wireless transmitter further comprising, for said value of l, means for:
placing data to be transmitted in a data vector $X^{(l)}$ with N real components,
calculating a coded data vector $S^{(l)} \equiv W^{(l)} \cdot X^{(l)}$ with M components, where $W^{(l)}$ is a precoding matrix of dimension M·N depending:
on a Zero-Forcing matrix Q and
on the real part of a matrix representing a spatial multiplexing $P^{(l)}$ followed by a channel transfer $\hat{H}^{(l)}$, and
transmitting said coded data vector $S^{(l)}$ on the sub-carrier l, by transmitting the m-th component, where m=1,2, . . . , M, of the vector $S^{(l)}$ from the m-th transmit antenna; and
said R wireless receiver(s), and wherein, for said value of l, at least one wireless receiver No. r, where r=1, . . . , R, comprises means for:
receiving said coded data,
determining a received vector $Y_{(r)}^{(l)}$ and
obtaining a decoded data vector $T_{(r)}^{(l)}$ on the basis of said received vector $Y_{(r)}^{(l)}$, where the received vector $Y_{(r)}^{(l)}$ is the vector with $N_r$ real components whose n-th component, where n=1,2, . . . , $N_r$, is equal to the symbol associated with the sub-carrier l received on the n-th receive antenna, after OFDM/OQAM demodulation and extraction of the real part.

11. An irremovable or partially or totally removable non-transitory computer-readable medium for storing data, comprising computer program code instructions stored thereon for execution of a method of wireless transmission, by a wireless transmitter comprising a processor and M≥1 transmit antenna(s), of data intended for R≥1 wireless receiver(s), each wireless receiver No. r, where r=1, . . . , R being furnished with $N_r$ receive antennas, where $\Sigma_{r=1}^R N_r = N$ and N≥2, in which said data are transmitted by using an OFDM/OQAM modulation comprising L≥1 sub-carriers when the instructions are executed by the processor, said wireless transmission comprising:
for at least one value of the integer l, where 0≤l≤L−1, a prior step of obtaining an estimate $\hat{H}^{(l)}$ of the transfer matrix, of dimension N·M of the MIMO channel between said transmit antennas and said receive antennas, and
for said value of l, the following steps:
placement of data to be transmitted in a data vector $X^{(l)}$ with N real components,
calculation of a coded data vector $S^{(l)} \equiv W^{(l)} \cdot X^{(l)}$ with M components, where $W^{(l)}$ is a precoding matrix of dimension M·N depending:
on a Zero-Forcing matrix Q, and on the real part of a matrix representing a spatial multiplexing $P^{(l)}$ followed by a channel transfer $\hat{H}^{(l)}$, and transmission of said coded data vector $S^{(l)}$ on the sub-carrier l, by transmitting the m-th component, where m=1,2, ..., M, of the vector $S^{(l)}$ from the m-th transmit antenna.

* * * * *

UNITED STATES PATENT AND TRADEMARK OFFICE
CERTIFICATE OF CORRECTION

PATENT NO.       : 9,553,651 B2  
APPLICATION NO.  : 14/401782  
DATED            : January 24, 2017  
INVENTOR(S)      : Dinh Thuy Phan Huy It is certified that error appears in the above-identified patent and that said Letters Patent is hereby corrected as shown below:

In the Claims

Column 12, Line 41, replace the first listed equation with the following:
$$\sum_{r=1}^{R} N_r = N$$

Column 13, Lines 19, 21, and 22, replace the listed equations with the following:
$$Y_{(r)}^{(l)}$$

Column 13, Line 20, replace the listed equation with the following:
$$T_{(r)}^{(l)}$$

Column 13, Line 33, replace the second listed equation with the following:
$$\sum_{r=1}^{R} N_r = N$$

Column 14, Line 11, replace the first listed equation with the following:
$$\sum_{r=1}^{R} N_r = N$$

Column 14, Lines 36, 38, and 39, replace the listed equations with the following:
$$Y_{(r)}^{(l)}$$

Column 14, Line 37, replace the listed equation with the following:
$$T_{(r)}^{(l)}$$

Column 14, Line 51, replace the second listed equation with the following:
$$\sum_{r=1}^{R} N_r = N$$

Signed and Sealed this  
Eighteenth Day of September, 2018

Andrei Iancu  
*Director of the United States Patent and Trademark Office*